(12) United States Patent
Edlinger et al.

(10) Patent No.: US 6,804,445 B2
(45) Date of Patent: Oct. 12, 2004

(54) WAVEGUIDE AND PROCESS FOR THE PRODUCTION THEREOF

(75) Inventors: Johannes Edlinger, Feldkirch (AT); Helmut Rudigier, Bad Ragaz (CH)

(73) Assignee: Unaxis Balzers AG, Balzers (LI)

( * ) Notice: Subject to any disclaimer, the term of this patent is extended or adjusted under 35 U.S.C. 154(b) by 0 days.

(21) Appl. No.: 10/457,852

(22) Filed: Jun. 10, 2003

(65) Prior Publication Data

US 2003/0227098 A1 Dec. 11, 2003

Related U.S. Application Data

(62) Division of application No. 08/751,369, filed on Nov. 19, 1996, now Pat. No. 6,610,222, which is a continuation of application No. 08/278,271, filed on Jul. 21, 1994, now abandoned.

(30) Foreign Application Priority Data

Jul. 26, 1993 (CH) .............................. 2255/93

(51) Int. Cl.$^7$ .............................. G02B 6/13; B29D 11/00
(52) U.S. Cl. ..................................... 385/131; 264/1.24
(58) Field of Search ................................. 385/129–132; 264/1.24

(56) References Cited

U.S. PATENT DOCUMENTS 4,749,245 A * 6/1988 Kawatsuki et al. ......... 385/130
5,170,461 A * 12/1992 Yoon et al. ................. 385/130

* cited by examiner

Primary Examiner—Akm Enayet Ullah
Assistant Examiner—Jerry T Rahll
(74) Attorney, Agent, or Firm—Notaro & Michalos P.C.

(57) ABSTRACT

A method for manufacturing an optical waveguide includes shaping a substrate of organic material, applying at least one intermediate layer by a first vacuum coating process onto the substrate and applying a waveguide layer by means of a second vacuum coated process onto the intermediate layer. The at least one intermediate layer is applied so that only a negligible part of light energy reaches an interface surface between the intermediate layer and the substrate.

29 Claims, 6 Drawing Sheets

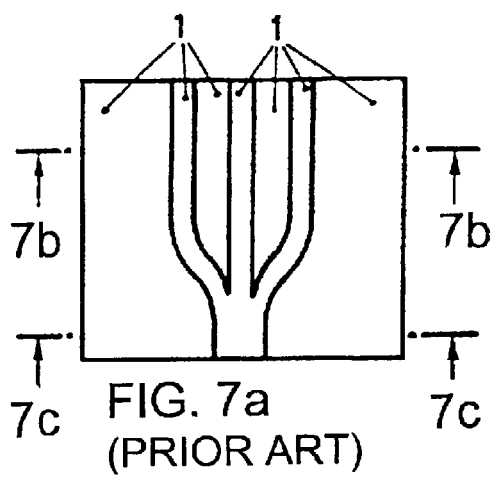
FIG. 7a
(PRIOR ART)
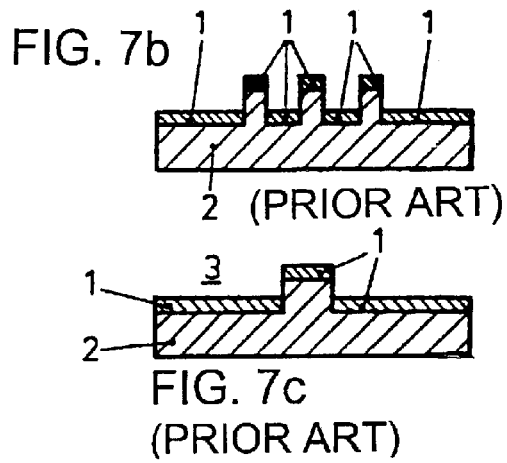
FIG. 7b (PRIOR ART)
FIG. 7c (PRIOR ART)
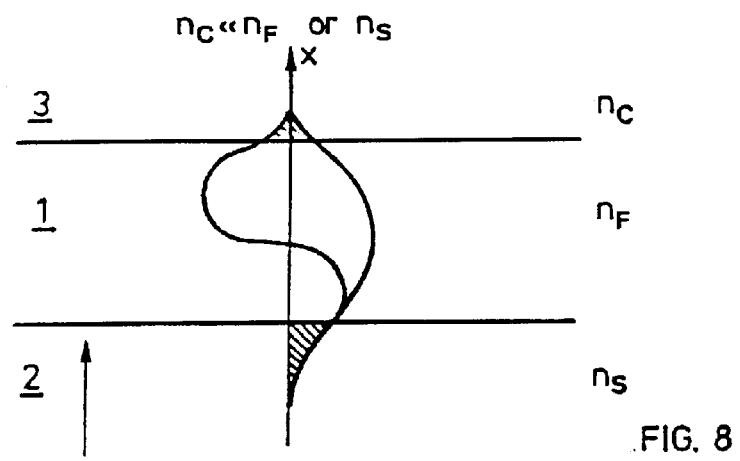
FIG. 8
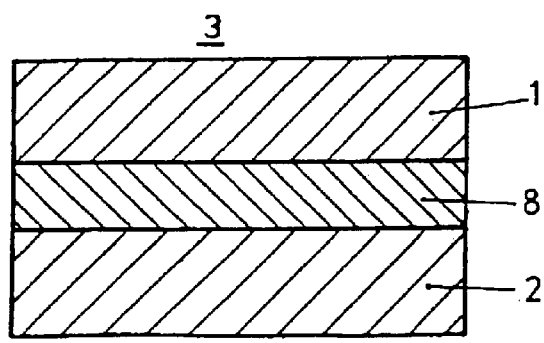
FIG. 9

$$A(dV) = \int_{dV} I(\bar{r})\alpha(\bar{r}) d\bar{r}$$

WAVEGUIDE AND PROCESS FOR THE PRODUCTION THEREOF

CROSS-REFERENCE TO RELATED APPLICATIONS

This is a division of application Ser. No. 08/751,369, filed Nov. 19, 1996, now U.S. Pat. No. 6,610,222 which is a continuation of Ser. No. 08/278,271 filed Jul. 21, 1994, now abandoned which claimed priority on Swiss application 02 255/93-5, filed Jul. 26, 1993, which priority claim is repeated here.

BACKGROUND OF THE INVENTION

The present invention concerns a waveguide, a process for producing a waveguide, and further use of an intermediate layer on a waveguide and use of an organic substrate as a carrier substrate on a waveguide.

For many uses, for example sensors, integrated optics and the like it is desirable to have planar waveguides available. As shown in FIG. 1a such a waveguide, in its simplest form, includes a waveguide layer 1 with a refractive index $n_F$ on a substrate 2 with a refractive index $n_S$ and an ambient medium 3, the so-called cover medium, or cover, with a refractive index $n_C$. The cover medium can in turn be formed by a layer or a layer system, as shown in FIG. 1b. The following applies: $n_C < n_F$ and $n_S < n_F$.

For many uses at least one of those layers must be structured. In order for light to be coupled at all into the waveguide, the method which is in fact the most elegant method involves providing the waveguide with a structure 4—a grating—, as shown in FIG. 2a, and coupling the light 5, for example a laser beam, into the waveguide layer 1 by way of diffraction. If the coupling-in angle, grating period and waveguide layer thickness are suitably selected, the light 6 is propagated in the waveguide layer 1 with a given propagation mode and leaves the waveguide for example at an end face 7.

It is immaterial whether the grating 4 is provided at the substrate surface or in or at the waveguide layer.

In addition it is often desirable for the waveguide to be spatially structured as a whole. FIG. 1b shows a waveguide without spatial structuring, FIGS. 3 and 4 show structured strip-type waveguides and FIG. 5 shows a buried strip-type waveguide. FIGS. 6 and 7 are a plan view and a view in section purely by way of example of more complex spatial structurings of a waveguide. Structured waveguides of that kind are widely used for example in the communications art or in the sensor art.

As waveguides of that kind are usually constructed on a glass substrate, the structuring procedures employed are photolithographic methods and the following etching methods: ion milling, reactive ion etching, wet-chemical etching and the like.

Such structuring procedures are time-consuming and expensive.

In addition waveguides on a glass substrate can only be shaped with difficulty and they are sensitive in regard to mechanical stresses such as impact stresses.

The substrate/waveguide layer/environment interaction but in particular the substrate/waveguide layer interaction which is relevant here substantially determines the waveguide property.

SUMMARY OF THE INVENTION

The problem of the present invention is to propose a waveguide:

a) in which structuring is substantially simpler and therefore less expensive and which possibly
b) is deformable within limits and/or
c) is less sensitive to mechanical stresses and/or
d) whose substrate can be used flexibly together with different waveguide layers and materials.

This is achieved in a waveguide of the kind set forth in the opening part of specification by the configuration set forth in the the claims.

Particularly when using a polymer, such as for example and as is preferred nowadays a polycarbonate, as the waveguide substrate, it is now very much cheaper to structure the waveguide in particular as a whole, whether this is done by embossing, deep-drawing, injection moulding and the like, and then in particular to provide the coating with a wave-conducting material. In that respect it is found that the application of a wave-conducting material to a substrate of organic material, in particular a polymer, is in no way trivial. It is observed in particular that the losses of a waveguide produced in that way, that is to say waveguide layer directly on the substrate, defined as a drop in terms of intensity with a given mode and a given wave length over a certain distance, are substantially higher, at least by a factor of 10, than when an inorganic material such as for example glass is used as the substrate material.

To our knowledge the problem involved here is substantially new territory. Admittedly there are indications in the literature, for example in "Design of integrated optical couplers and interferometers suitable for low-cost mass production", R. E. Kunz and J. S. Gu, ECIO 93-Conferenz in Neuchâtel, that integrated optics could be inexpensively made from structured plastics material, but such reports can only document an existing need.

It is self-evident however that on the one hand all structuring procedures for organic materials, in particular polymers, and on the other hand coating processes such as CVD, PECVD, including vapour deposit, sputtering, ion plating, etc., belong to the state of the art. In that respect coating of plastics parts, for example spectacle lenses, reflectors etc. with very different materials also belongs to the state of the art, for example including by means of plasma polymerisation.

Attention should further be directed to the theory of planar waveguides in "Integrated Optics: Theory and Technology", R. G. Hunsperger, Springer Series in Optical Sciences, Springer-Verlag 1984.

The invention, in regard to its various aspects, with preferred embodiments also being the subject-matter of the further claims, is described hereinafter by means of Examples and Figures.

BRIEF DESCRIPTION OF THE DRAWINGS

In that respect in the Figures which have already been in part described:

FIGS. 6 and 7 are a plan view and a view in section of waveguides with more complex structuring, FIG. 8 is a diagrammatic view showing energy distributions or oscillation modes which occur for example on an asymmetrical waveguide in accordance with "Integrated Optics: Theory and Technology", Robert G. Hunsperger, Second Edition, Springer-Verlag 1984, page 36, FIG. 9 is a cross-sectional view of a waveguide according to the invention.

DESCRIPTION OF THE PREFERRED EMBODIMENTS

To explain the realisation which is the underlying basis of the invention FIG. 8 records the mode distribution on an asymmetrical waveguide comprising the waveguide layer 1, the substrate 2 and the cover 3. The field distribution of the two recorded modes is clear therefrom. It will be seen that the field or light energy is propagated not only in the wave-conducting layer 1, but also in the adjacent media, namely in the cover and the substrate. The percentage proportion of the energy which occurs outside the waveguide layer 1 depends inter alia on the thickness of the waveguide layer 1 and also the refractive indices $n_C$, $n_F$, $n_S$, the mode type (TE, TM) and the mode number. In the case of thin waveguide layers the energy proportion which occurs as a percentage in the substrate is greater than in the case of thicker layers. Thin layers however are of outstanding interest in particular for certain uses in the sensor art.

Figure 1A:
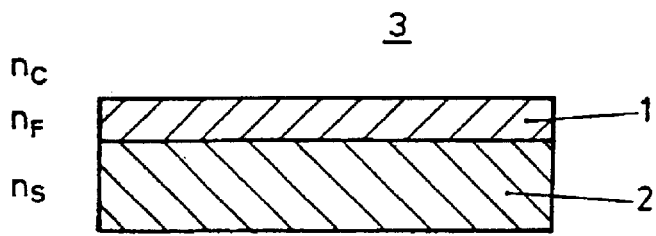
FIG. 1a shows a view in cross-section through a waveguide of conventional kind.
Figure 1B:
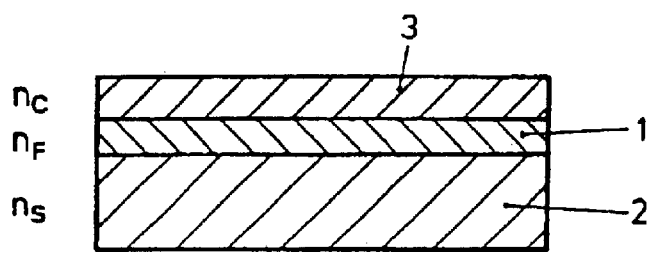
FIG. 1b is a view corresponding to FIG. 1a of a waveguide with cover layer.
Figure 2:
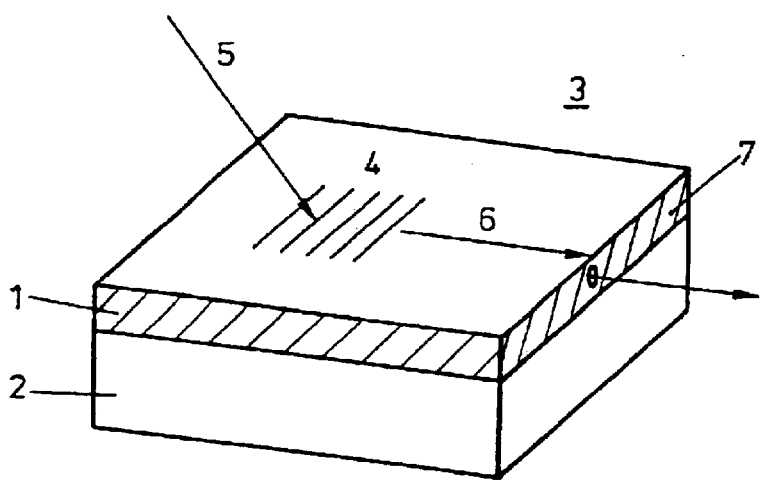
FIG. 2 is a diagrammatic perspective view of a portion of a waveguide to describe a structuring provided in the waveguide layer or substrate for coupling-in light.
Figure 3:
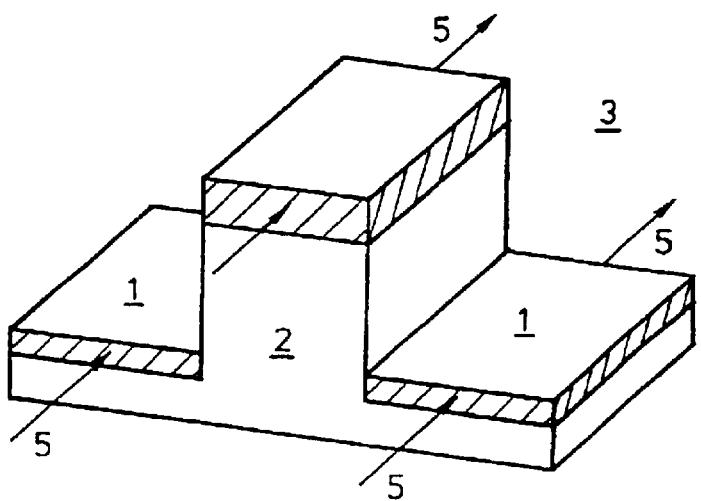
FIGS. 3 and 4 are diagrammatic perspective views of waveguides, with spatial structuring.
Figure 4:
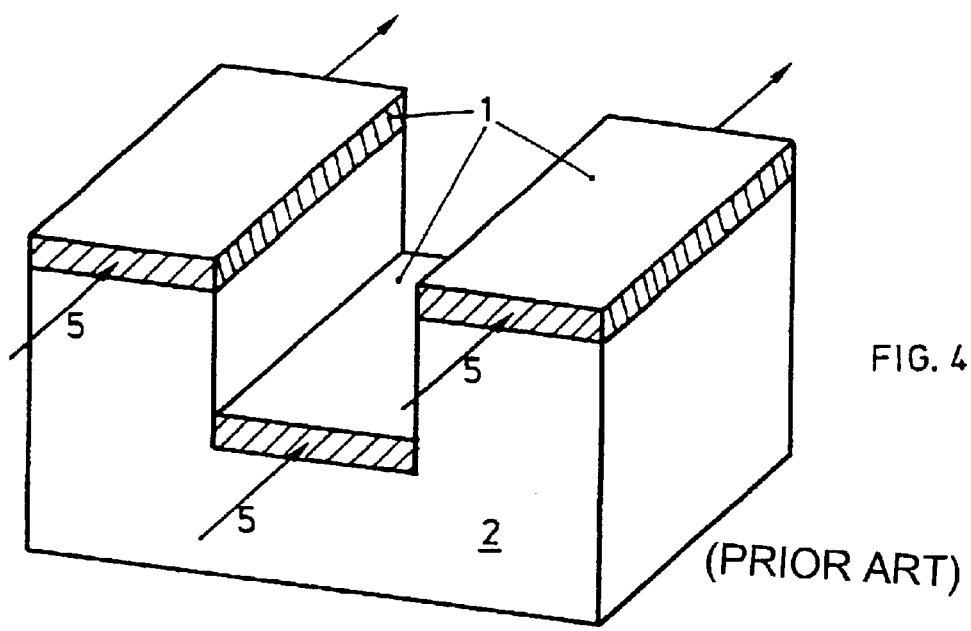
Figure 5:
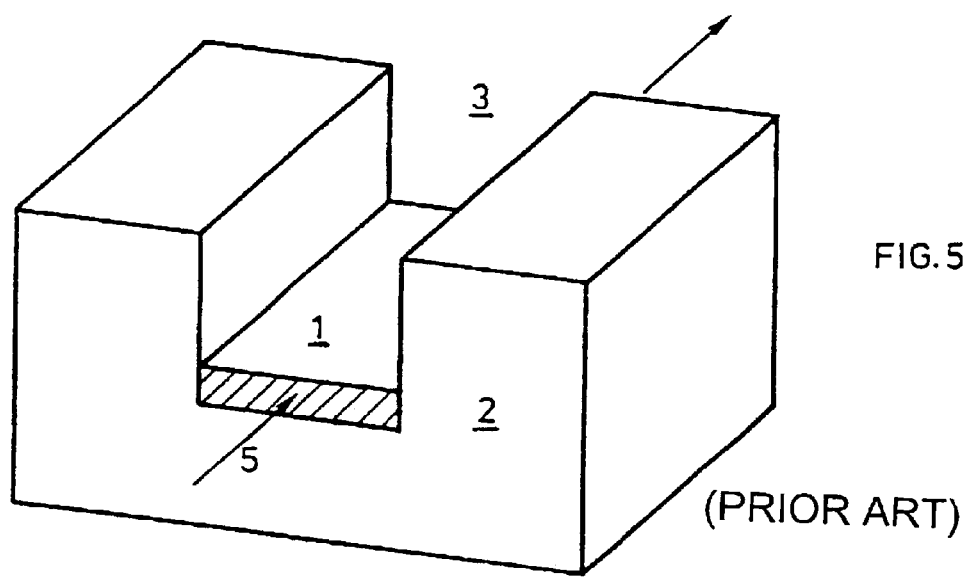
FIG. 5 is a view corresponding to FIG. 3 or FIG. 4 showing structuring with a "buried" waveguide.
Figure 6A:
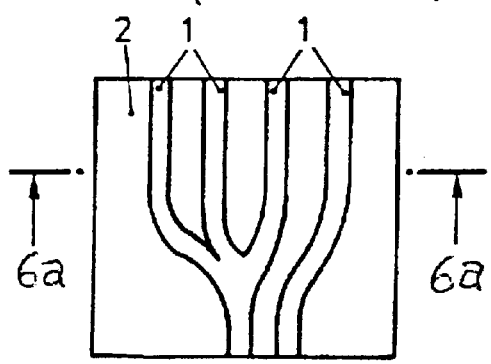
Figure 6B:
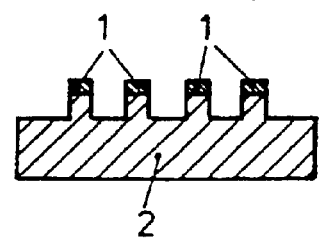
Figure 10:
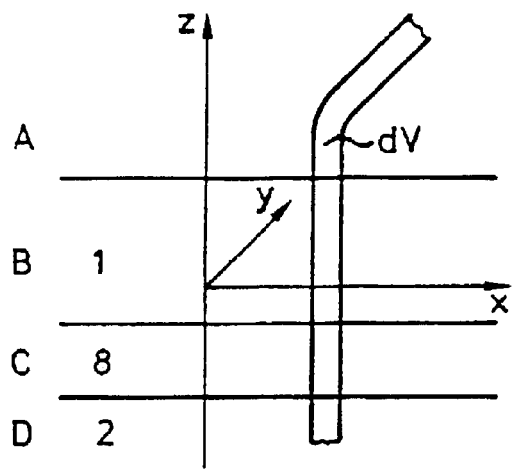
FIG. 10 is a diagrammatic view of a waveguide structure for defining its absorption or attenuation.

FIG. 10 shows by way of example superposed layers or phases A to D. The losses A (dV) in a volume element dV shown as a disk in FIG. 10 is defined as the volume integral of the local light intensity $I(\bar{r})$ and a general loss coefficient $\alpha(\bar{r})$ which inter alia takes account of local absorption and diffusion. Accordingly the following applies in regard to the losses:

$$A(dV) = \int_{dV} I(\bar{r})\alpha(\bar{r})d\bar{r}$$

wherein $\bar{r}$ denotes the radius vector.

It will be seen therefrom, looking back at FIG. 8, that the total losses of a waveguide as shown in FIG. 8 increase in proportion in particular to the increasing loss value α in the substrate but in particular at the substrate/waveguide interface and in proportion to the percentage amount of energy which occurs in particular however at the substrate/waveguide interface.

While wave-conducting layers on glass, for example on Corning 7059 overall have very low losses or a very low level of absorption, the losses of the same wave-conducting layers on organic material as a substrate material, such as in particular polymer substrates, for example on polycarbonate substrates, are higher at least by a factor of 10, in dependence on the thickness of the waveguide layer 1 and accordingly the percentage proportion of energy which occurs in the substrate material but in particular at the substrate/waveguide interface.

In that respect the above-mentioned increase in losses is not only a consequence of the respective coating process specifically employed but also a consequence of the interaction, discussed with reference to FIG. 8, of the substrate material and the wave-conducting layer.

FIG. 9 shows the structure of a waveguide according to the invention. It comprises a substrate 2 of organic material, in particular a polymer such as for example polycarbonate. The waveguide layer 1 is separated from the substrate 2 by at least one intermediate layer 8.

In accordance with the invention, the intermediate layer 8 and possibly an intermediate layer system 8 provides that light intensity I in the waveguide is low where the general loss coefficient α is high, whereby the losses are minimized. That is achieved by providing for a suitable configuration of the refractive index profile on the waveguide normal to the surface thereof.

Materials

1. Materials for the Wave-conducting Layer 1:

The following are preferably used in particular for the wavelength range of 400 nm to 1000 nm:

$TiO_2$, $Ta_2O_5$, $ZrO_2$, $Al_2O_3$, $SiO_2$—$TiO_2$, $HfO_2$, $Y_2O_3$, $Nb_2O_5$, silicon nitride, oxynitride ($SiO_xN_y$, $HfO_xN_y$, $AlO_xN_y$, $TiO_xN_y$, $TaO_xN_y$) and $MgF_2$, $CaF_2$.

For wavelengths >1000 nm silicon, $SiO_x$, Ge, GaAs and GaAlAs preferably fall to be considered.

2. Substrate:

Organic materials, in that respect in particular polymers such as polycarbonate, PVC, polymethylmethacrylate (PMMA), and PET.

3. Material of the at Least One and Preferably the One Intermediate Layer 8:

Inorganic dielectric materials, in particular oxides, nitrides, carbides and the mixed forms thereof such as in particular $SiO_2$, $Si_3N_4$, more generally $SiO_xN_y$, and mixed materials, in particular with an $SiO_2$-component, an $Si_3N_4$-component or, more generally, an $SO_xN_y$-component.

4. Cover:

All known techniques with exposed waveguide layer or waveguide layer covered with a cover layer.

Processing Procedures:

1. Application of the Waveguide Layer

Preferably vacuum coating processes are used for this purpose, in particular plasma-enhanced CVD-processes (PECVD), CVD-processes, reactive PVD-processes, in particular reactive vapour deposit, sputter coating and ion plating. The plasmas used are DC- or AC-fed, which includes low-frequency HF- and microwave plasmas and DC+AC-mixed forms. It is also possible to use non-vacuum coating processes such as for example dip drawing and spin coating.

Having regard to the fact that the at least one wave-conducting layer 1 is to be applied to the substrate material used in accordance with the invention, coating processes are preferably used in which the substrate temperature is lower than the softening temperature of the substrate material employed, in particular <100° C., preferably <60° C.

2. Application of the at Least One Intermediate Layer:

The same methods are used as for applying the waveguide layer, with the same limitations in regard to substrate temperature control. It is additionally possible to use plasma polymerisation if for example a silicon-containing monomer is used for the layer deposit operation.

3. Substrate:

The substrate of organic material, by far and away preferably a polymer, is shaped by means of a process which is known for processing plastics material. That includes in particular embossing, deep drawing, injection moulding and blow moulding (for PET-plastics).

Besides the optical function, namely providing for light intensity at an optimum low level in substrate material or at a substrate/layer interface, with a high level of absorption, the intermediate layer used in accordance with the invention or a layer of the intermediate layer system used in accordance with the invention acts as a bonding layer between the substrate on the one hand and the superposed layers. It is entirely possible to provide, towards the waveguide layer, a first intermediate layer which principally provides the desired optical insulation effect, and to solve the adhesion problem by means of a further intermediate layer, bearing against the substrate.

The losses at a waveguide according to the invention are of the same order of magnitude as the losses on conventional waveguides of glass substrate, and are in particular less than 100 dB/cm, preferably less than 50 dB/cm and in particular even lower than 10 dB/cm.

Moreover a fact of extraordinary importance is that the provision of the intermediate layer 8 in accordance with the invention, as shown in FIG. 9, means that the properties of the waveguide layer 1 are decoupled from those of the substrate 2. That affords the possibility, which is utilised in accordance with the invention, of using different waveguide layer materials on a substrate of a given material depending on the respective purpose of use involved (wavelength, mode), without the correspondingly varying interactions between the waveguide layer material and the substrate material having to be taken into consideration to a substantial degree. That also makes it possible to select in particular polymer materials which are to satisfy other criteria than optical criteria, as the substrate material.

As was made clear, the structurings shown by way of example in particular in FIGS. 2, 3 and 4 to 7 can be easily effected with the substrate material which is provided in accordance with the invention, and maintenance of the good optical properties which are known from the use of glass substrate is ensured by the provision of the intermediate layer in accordance with the invention.

FIGS. 11a to 11f show preferred refractive index profiles in relation to the thickness dimension z of the waveguide according to the invention. Therein the identification "ZS" denotes "intermediate layer", the identification "S" denotes "substrate" and the identification "F" denotes the "waveguide layer".

In regard to establishing the refractive index or the refractive index variation by way of the intermediate layer which is provided in accordance with the invention, corresponding to its thickness dimension $D_{ZS}$, there are various possible alternatives, as can be seen from these Figures. In most cases the refractive index of the intermediate layer is chosen to be lower than that $n_F$ of the waveguide layer. As is clear from FIGS. 11b, 11d, 11e and 11f, it is readily possible for the configuration of the refractive index to be formed with a gradient, in particular in the intermediate layer or the intermediate layer system. That variant is preferably to be adopted when the intermediate layer is applied by plasma polymerisation.

Figure 11A:
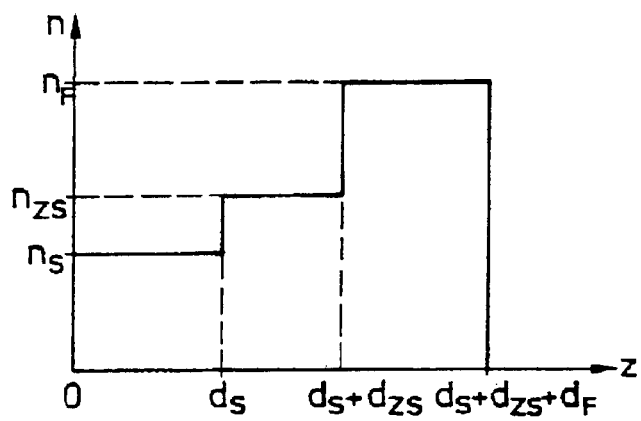
FIGS. 11a to 11f show various possible refractive index variations plotted in relation to the thickness dimension on waveguides according to the invention.
Figure 11B:
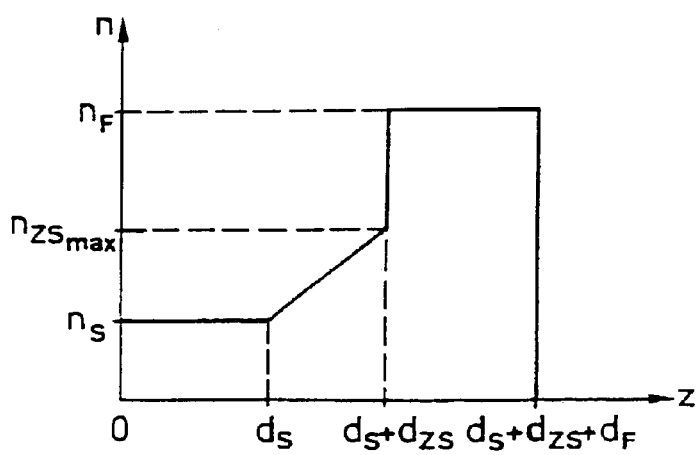
Figure 11C:
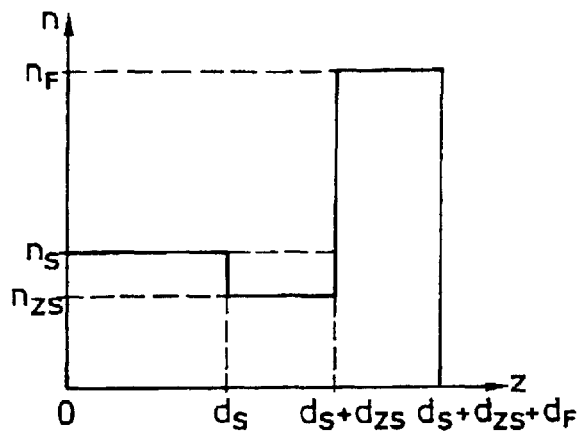
Figure 11D:
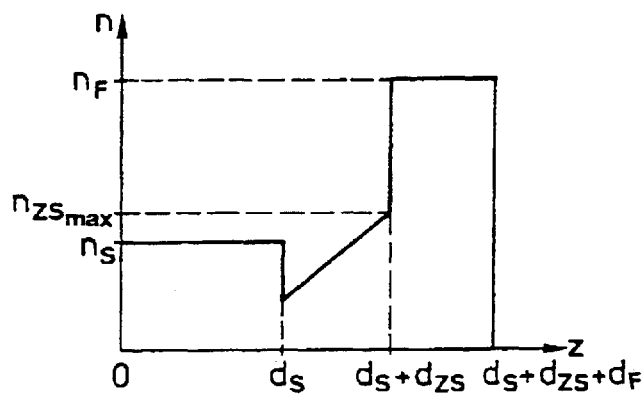
Figure 11E:
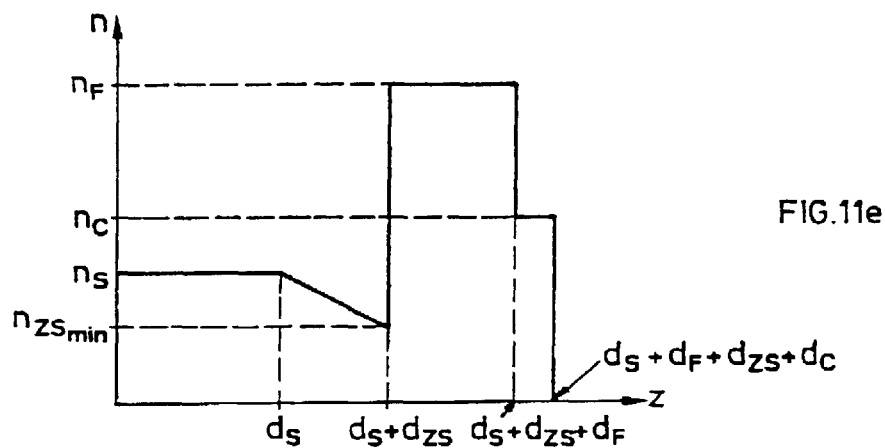
Figure 11F:
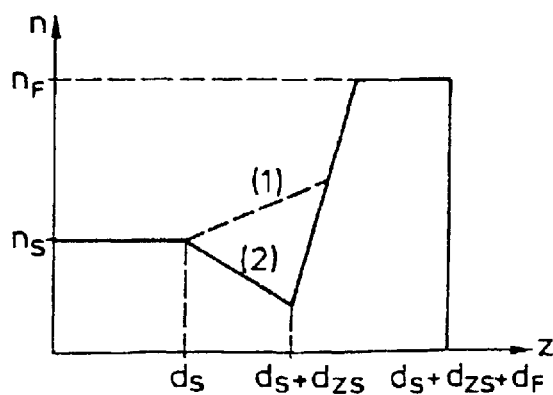

In this respect, FIG. 11f shows two possibilities whereby the refractive index of the intermediate layer, starting from the refractive index of the substrate material $n_S$, rises or falls. It is further shown therein that a refractive index gradient can be provided, for example by virtue of a diffusion zone, in the interface region between the intermediate layer and the waveguide layer. The thickness of the intermediate layer is preferably such that only a negligible proportion of the light energy I passes into the high-loss zone of the substrate/waveguide interface.

When a layer of inorganic material, more specifically waveguide layer material, is directly applied to an organic substrate material, in particular a polymer material, there is a high level of probability that reactions occur between components of the polymer and those of the applied wave-conducting layer. There is a high level of probability that this reaction results in a high-absorption transitional phase. This is if the waveguide were applied directly to a polymer substrate.

In accordance with the invention however, because of the similarity between the inorganic intermediate layer material and the waveguide layer material, such an interface reaction occurs to a much lesser degree, and any interface reaction between the intermediate layer material and the substrate material results only in low losses because the intermediate layer ensures that only low light energy values lead to losses at all at that interface.

Therefore the intermediate layer according to the invention does not suppress the above-mentioned interface reaction at the substrate surface, but in practice a glass intermediate layer is simulated between the substrate and the waveguide layer. Unwanted surface roughnesses at the substrate used in accordance with the invention are smoothed out to a certain degree by the provision of the intermediate layer according to the invention, in dependence on the coating parameters.

A waveguide with the refractive index profile was produced in principle as shown in FIG. 11c, under the following conditions. The substrate material used was polycarbonate with a refractive index $n_S=1.538$. The intermediate layer material used was $SiO_2$ while the material of the waveguide layer was $TiO_2$. The waveguide was not covered but air acts as the cover medium.

Process Parameters for $TiO_2$-waveguide on a PC7-substrate with an $SiO_2$-intermediate Layer:

Intermediate Layer Coating Process:

Sputter coating with plasma production from a DC-source whose output is temporarily cyclically separated from the plasma discharge section and the latter is temporarily short-circuited.

Figure 12:
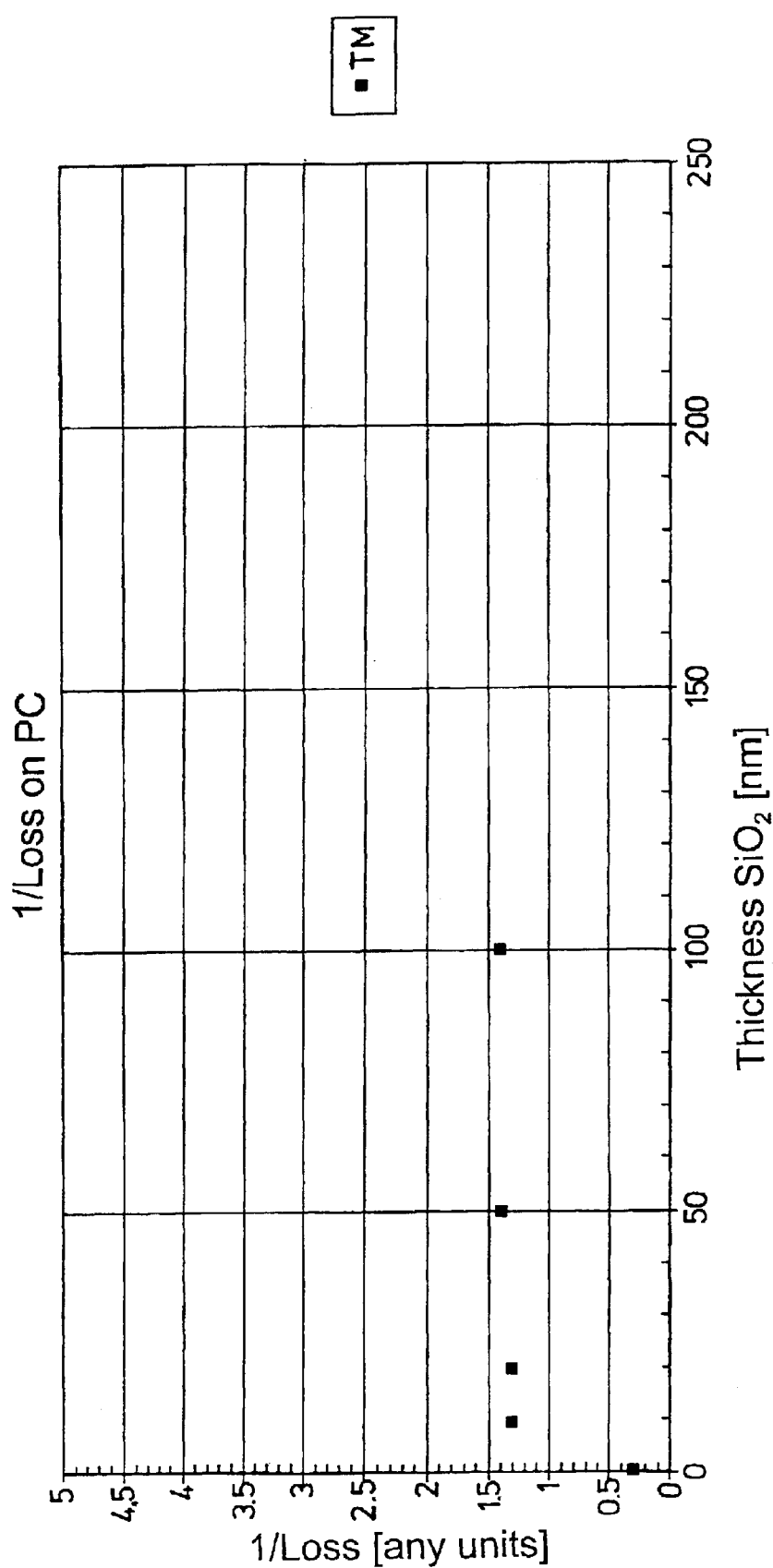
FIG. 12 shows in relation to the thickness dimension of a silicon dioxide intermediate layer provided in accordance with the invention the relative losses in dB on the resulting waveguide according to the invention and at the layer thickness 0 the losses thereof without an intermediate layer provided in accordance with the invention.

Target:

| | |
|---|---|
| Target: | Ak525; SiS23379 |
| Magnetron: | MC-525 |
| Distance between target and substrate: | 70 mm |
| DC-source: | 10 kW |
| Vacuum chamber: | BAK-760 S |
| Argon pressure: | pAr = 4E-3 mbar |
| Set discharge power: | p = 6 kW |
| DC-voltage in the metal mode: | Usb = −695 V |
| DC-voltage in the transition mode: | Usb = −595 V |
| Argon flow: | qAr = 58.8 sccm |
| $O_2$-flow: | $qO_2$ = 47 sccm |
| $SiO_2$-layer thickness: | varying as shown in Figure 12 |
| Sputter rate: | R = 0.28 nm/s |
| Production of the waveguide layer: | By means of sputtering as for the production of the intermediate layer. |

-continued

| | |
|---|---|
| Target: | Ak525; TI92-421/1 |
| Magnetron: | MC-525 |
| Distance target/intermediate layer-coated substrate | 70 mm |
| DC-source: | 10 kW |
| Vacuum chamber: | BAK-760 S |
| Argon pressure: | pAr = 4E-3 mbar |
| Plasma discharge power: | P = 6 kW |
| DC-voltage in the metal mode: | Usb = −531 V |
| DC-voltage in the transition mode: | Usb = −534 V |
| Argon flow: | qAr = 57.4 sccm |
| Oxygen flow: | $qO_2$ = 17 sccm |
| Thickness of the $TiO_2$-waveguide layer: | 95 nm |
| Sputter rate: | R = 0.069 nm/s |

Taking the resulting waveguide, the losses found were about 8 dB/cm in the TM-mode and at a wavelength of 633 nm, with a thickness d $SiO_2$ of 20 nm.

FIG. 12 records the relative losses in dB in relation to the thickness d of the $SiO_2$-intermediate layer. An improvement of about a factor of 2 is already achieved with an intermediate layer thickness of 5 nm. It will be clear therefrom that, with a vanishing intermediate layer, the losses increase by about a factor of 4, compared to the losses with the provision of an intermediate layer of 10 nm.

It is therefore also proposed that preferably the intermediate layer should be provided in accordance with the invention with a thickness of <10 nm, and in that respect, as will be readily apparent, as thin as possible in order to minimise the production costs, that is to say preferably about 10 nm.

What is claimed is:

1. A method of manufacturing an optical waveguide comprising the steps of:
   (a) shaping a substrate consisting essentially of organic material only;
   applying at least one intermediate layer by a first vacuum coating process onto the substrate; and
   (c) applying a waveguide layer by means of a second vacuum coating process onto the intermediate layer;
   (d) said at least one intermediate layer being applied so that only a negligible part of light energy reaches an interface surface between said intermediate layer and said substrate.

2. The method of claim 1, said first and second vacuum coating processes being same processes.

3. The method of claim 1, wherein said second process is one of a plasma-enhanced CVD process, a CVD process, a reactive PVD process.

4. The method of claim 1, wherein said second process is one of reactive vapor deposition, reactive sputtering and ion plating.

5. The method of claim 1, wherein said first process is one of a plasma-enhanced CVD process, a CVD process, a reactive PVD process, plasma polymerization.

6. The method of claim 1, wherein said first process is one of reactive vapor deposition, reactive sputtering and ion plating.

7. The method of claim 1, wherein the shaping operation comprises embossing, deepdrawing or injection molding of the substrate.

8. The method of claim 1, wherein said substrate is of a polymer material.

9. The method of claim 1, wherein said substrate material is a polycarbonate.

10. The method of claim 1, wherein said shaping is performed one of before and of after performing said step of applying said at least one intermediate layer.

11. The process of claim 1, wherein said step of applying said at least one intermediate layer comprises applying at least one intermediate layer of an is organic material.

12. The method of claim 11, wherein said inorganic material comprises at least one of $SiO_2$ and $Si_3N_4$.

13. The method of claim 1, wherein the step of applying said at least one intermediate layer and the step of applying said waveguide layer are performed at the maximum substrate temperature of 100° C.

14. The method of claim 13, wherein said temperature is 60° C. maximum.

15. The method of claim 1, wherein said waveguide layer bears directly onto the intermediate layer, the index of refraction of the material of said intermediate layer being smaller than the index of refraction of the material of said waveguide layer.

16. The method of claim 1, wherein an intermediate layer, which bears against said waveguide layer and is located between said waveguide layer and said substrate has a substantially lower level of propagation attenuation than said substrate.

17. The method of claim 1, wherein material of said waveguide layer is selected from one of the groups (a) or (b) consisting essentially of:
   (a) $TiO_2$, $TaO_5$, $ZrO_2$, $Al_2O_3$, $SiO_2$—$TiO_2$, $HfO_2$, $Y_2O_3$, $Nb_2O_5$, silicon nitride, oxynitride $SiO_xN_y$, $HfO_xN_y$, $AlO_xN_y$, $TiO_xN_y$, $TaO_xN_y$ and $MgF_2$, $CaF_2$,
   (b) silicone, $SiO_x$, Ge, GaAs, GaAlAs.

18. The method of claim 17, wherein the material of group (a) is selected as waveguide layer material for guiding light with a wavelength of between 400 nm and 1000 nm.

19. The method of claim 17, wherein the material of said waveguide layer is selected from group (b) for guiding light with a wavelength larger than 1000 nm.

20. The method of claim 1, wherein said at least one intermediate layer is applied containing at least one of $SiO_2$ and of a mixture of $SiO_2$ and $TiO_2$ and of $Si_3N_4$.

21. The method of claim 1, wherein said at least one intermediate layer is of one of $SiO_2$ and of $Si_3N_4$.

22. The method of claim 1, wherein said at least one intermediate layer is applied with a thickness of at least 5 nm.

23. The method of claim 1, wherein said at least one intermediate layer is applied with a thickness of at least 10 nm.

24. The method of claim 1, wherein at least one of applying said at least one intermediate and of applying said waveguide layer is performed by sputtering with a DC plasma discharge supplied by a DC generator, thereby comprising the step of cyclically separating said generator from the plasma discharge and simultaneously short-circuiting said plasma discharge.

25. The method of claim 1, wherein said at least one intermediate layer is deposited with a predetermined course of index of refraction along the thickness of said layer.

26. The method of claim 25, wherein the course of, index of fraction across said at least one intermediate layer starts at a position adjacent said subs rate with a value corresponding to the value of the refractive index of said substrate.

27. The method of claim 1, further comprising the step of simulating an intermediate substrate of glass between said substrate of organic material and said waveguide layer by applying said at least one intermediate layer.

28. The method of claim 1, including reducing propagation loss in said optical waveguide by a factor of at least 3 by means of applying said at least one intermediate layer compared with a propagation loss of the optical waveguide without said intermediate layer.

29. The method of claim 1, wherein at least one of said first and second processes comprises magnetron sputtering.

* * * * *